United States Patent [19]

Klaren

[11] Patent Number: 5,347,984
[45] Date of Patent: Sep. 20, 1994

[54] SOLAR POOL HEATER

[76] Inventor: Johannes A. Klaren, 3520 W. Cogwood Cir., Beverly Hills, Fla. 34465

[21] Appl. No.: 194,858

[22] Filed: Feb. 19, 1994

[51] Int. Cl.5 .............................................. F24J 2/42
[52] U.S. Cl. .................................. 126/564; 126/568; 4/493; 4/498
[58] Field of Search ............................ 126/561-568, 126/675; 4/498, 493, 503, 499, 494, 504, 505, 502

[56] References Cited

U.S. PATENT DOCUMENTS

| | | | |
|---|---|---|---|
| 4,022,187 | 5/1977 | Roberts | 126/565 |
| 4,146,015 | 3/1979 | Acker | 126/565 |
| 4,284,060 | 8/1981 | McCluskey | 126/566 |
| 4,366,806 | 1/1983 | Acker | 4/498 |
| 4,474,168 | 10/1984 | Petit | 126/566 |
| 5,143,052 | 9/1992 | Case | 126/565 |
| 5,216,762 | 6/1993 | Denny | 126/566 |

FOREIGN PATENT DOCUMENTS

| | | | |
|---|---|---|---|
| 2315067 | 1/1977 | France | 126/564 |
| 8540 | 1/1977 | Japan | 126/568 |

Primary Examiner—James C. Yeung
Attorney, Agent, or Firm—Hugh E. Smith

[57] ABSTRACT

An inexpensive, easy to use and to store, solar pool heater which comprises a flexible corrugated plastic sheet having one side thereof matte black and the other side thereof white in color and tubular plastic floats removeably secured to two edges of said sheet and suspending said sheet a short distance below the surface of the water of a pool when said sheet and floats are placed therein. During daylight hours, the sheet is positioned with the black, heat absorbing surface upwards and then, at night, the sheet may be reversed with the white surface uppermost to minimize heat loss from the water. The sheet is relatively small, e.g. 1 meter square, and in use, multiple sheets and floats are interconnected to give the desired coverage to the pool surface. Being small in area, the sheets may be removed from the pool and stored in a small space as by hanging from the wall of the pool enclosure. The submerged corrugations provide considerably more heat transfer surface than can be achieved by a smooth surface such as a film.

2 Claims, 5 Drawing Sheets

SOLAR POOL HEATER

BACKGROUND OF THE INVENTION

1. Field of the Invention

The present invention relates to solar pool heaters and more particularly pertains to such a heater which is compact, inexpensive and convenient to use and to store.

2. Description of the Prior Art

The use of solar pool heaters is known in the prior art. More specifically, such heaters heretofore devised and utilized for the purpose of transferring solar heat to the water in a swimming pool are known to consist basically of familiar, expected and obvious structural configurations, notwithstanding the myriad of designs encompassed by the crowded prior art which have been developed for the fulfillment of countless objectives and requirements. Some, such as that is shown in U.S. Pat. No. 4,474,168 are built into the pool structure. Others of the floating variety include membranes, e.g. U.S. Pat. No. 4,366,806; small enclosed heat concentrating devices such as shown in U.S. Pat. No. 4,284,060 and U.S. Pat. No. 3,893,443; and floating tubular members through which the water may flow as in U.S. Pat. No. 5,143,052. All of these prior art devices are either relatively expensive to construct or are bulky in nature.

In this respect, the heater according to the present invention substantially departs from the conventional concepts and designs of the prior art, and in so doing provides an apparatus primarily developed for the purpose of providing an inexpensive, easily stored efficient solar heater.

SUMMARY OF THE INVENTION

In view of the foregoing disadvantages inherent in the known types of solar pool heaters now present in the prior art, the present invention provides an improved construction wherein the same can be utilized to inexpensively provide solar heat, is adaptable to various size pools and is easily stored when not in use. As such, the general purpose of the present invention, which will be described subsequently in greater detail, is to provide a new and improved solar pool heater which has many of the advantages of the prior art devices and non of the disadvantages.

To attain this, the present invention relates to an inexpensive easy to use and to store solar pool heater which comprises a flexible corrugated plastic sheet having one side thereof matte black and the other side thereof white in color and tubular plastic floats removeably secured to two edges of said sheet and suspending said sheet a short distance below the surface of the water of a pool when said sheet and floats are placed therein. During daylight hours, the sheet is positioned with the black, heat absorbing surface upwards and then, at night, the sheet may be reversed with the white surface uppermost to minimize heat loss from the water.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable tile U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar pool heater apparatus and method which has many of the advantages of the prior art heaters mentioned heretofore and many novel features that result in a pool heater which is not anticipated, rendered obvious, suggested, or even implied by any of the prior art devices either alone or in any combination thereof.

It is another object of the present invention to provide a new and improved solar pool heater which may be easily and efficiently manufactured and marketed.

It is a further object of the present invention to provide a new and improved solar pool heater which is of a durable and reliable construction.

An even further object of the present invention is to provide a new and improved solar pool heater which is susceptible of a low cost of manufacture with regard to both materials and labor, and which accordingly is then susceptible of low prices of sale to the consuming public, thereby making such heaters economically available to the buying public.

Still yet another object of the present invention is to provide a new and improved solar pool heater which provides in the apparatuses of the prior art some of the advantages thereof, while simultaneously overcoming some of the disadvantages normally associated therewith.

Still another object of the present invention is to provide a new and improved solar pool heater and adaptable to various sizes of pools.

Yet another object of the present invention is to provide a new and improved solar pool heater which may be used to retain heat in the pool water.

Even still another object of the present invention is to provide a new and improved solar pool heater which may be easily be stored in a small space when not in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
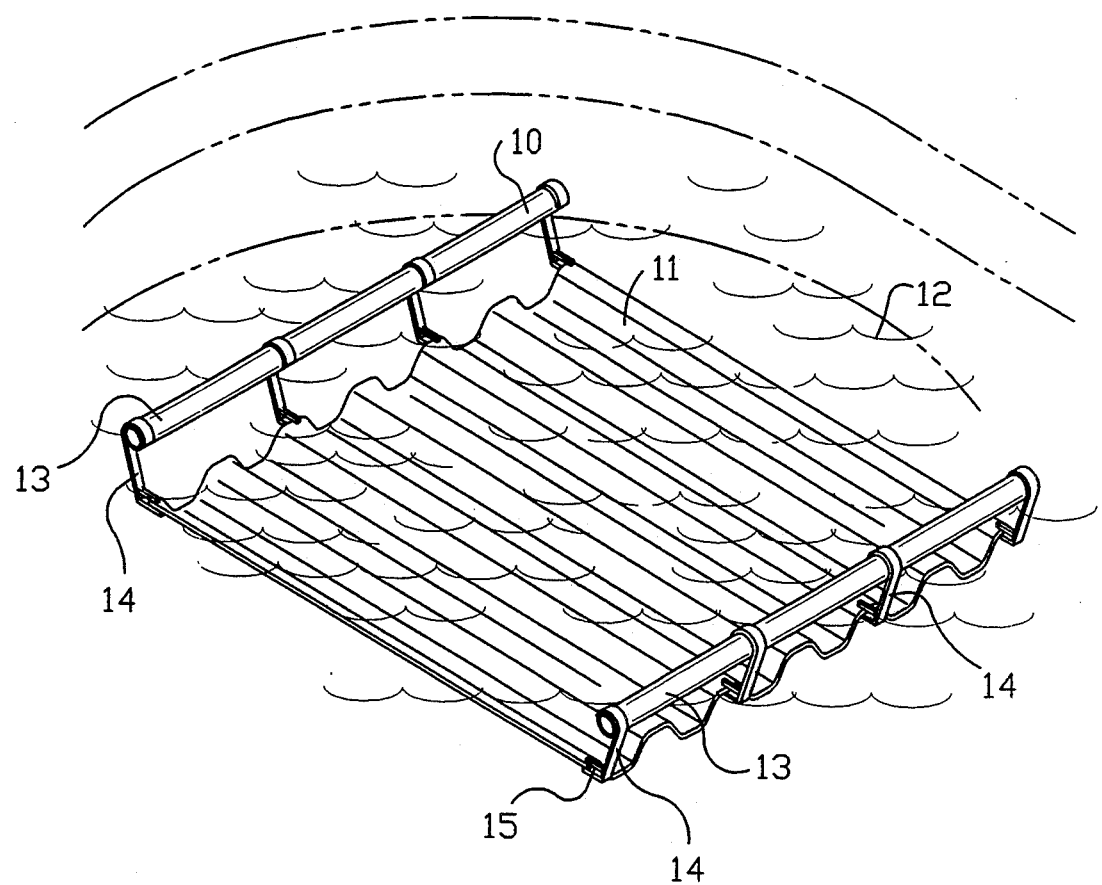
FIG. 1 is a perspective top view of a unit of the present invention in place in a pool.

With reference now to the drawings, and in particular to FIG. 1 thereof, a new and improved solar pool heater embodying the principles and concepts of the present invention and generally designated by the reference numeral 10 will be described.

More specifically, it will be noted that the heater 10 has a flexible corrugated sheet of plastic 11 suspended approximately six centimeters below the surface of the water 12 in which the sheet 11 is submerged. Such sheet 11 is supported by a pair of floatable plastic tubes 13 of the same length as sheet 11. Sheet 11 is preferably about 1 meter by 1 meter in size. Plastic hook members 14 removably engage around the plastic tubes 13 at their upper ends and removably engage the edges of sheet 11 in spring clips 15 at their lower ends as more clearly shown in FIGS. 3 and 5 below.

Figure 2:
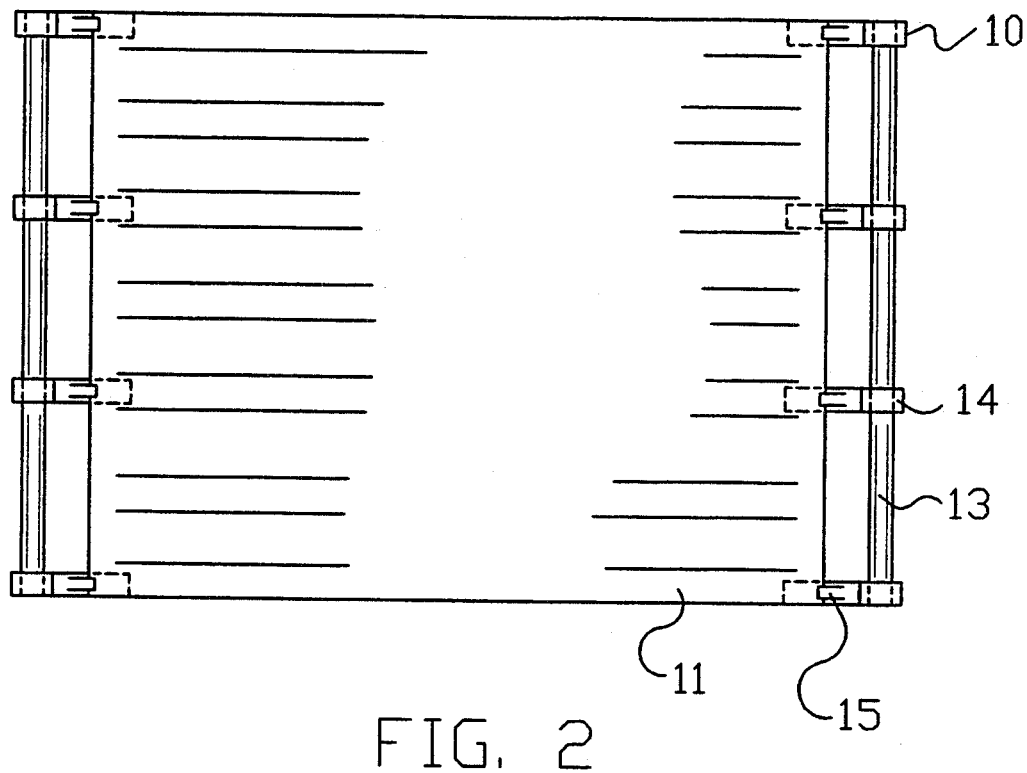
FIG. 2 is a top plan view of the unit shown in FIG. 1.
Figure 3:
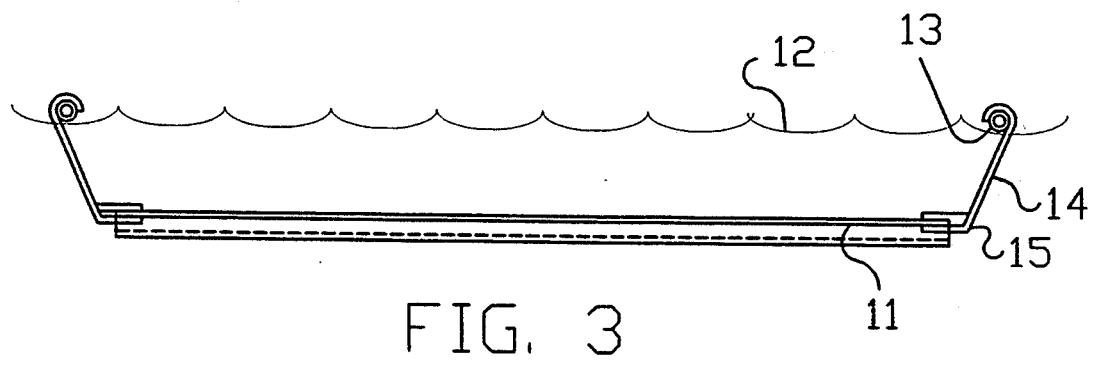
FIG. 3 is an end view of the unit of FIG. 2.
Figure 4:
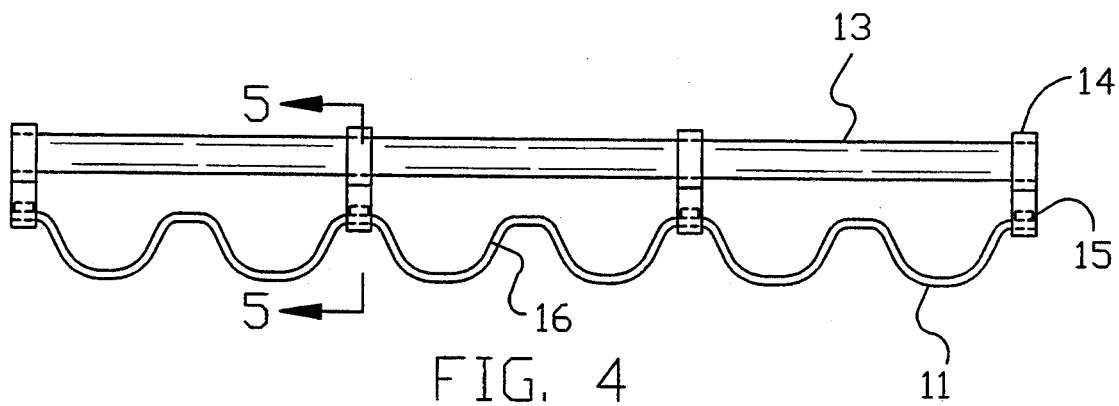
FIG. 4 is a side view of the unit of FIG. 2

FIGS. 2, 3 and 4 are plan views of the heater 10 illustrating the description given above. FIG. 4 clearly shows the corrugations 16 in sheet 11.

Figure 5:
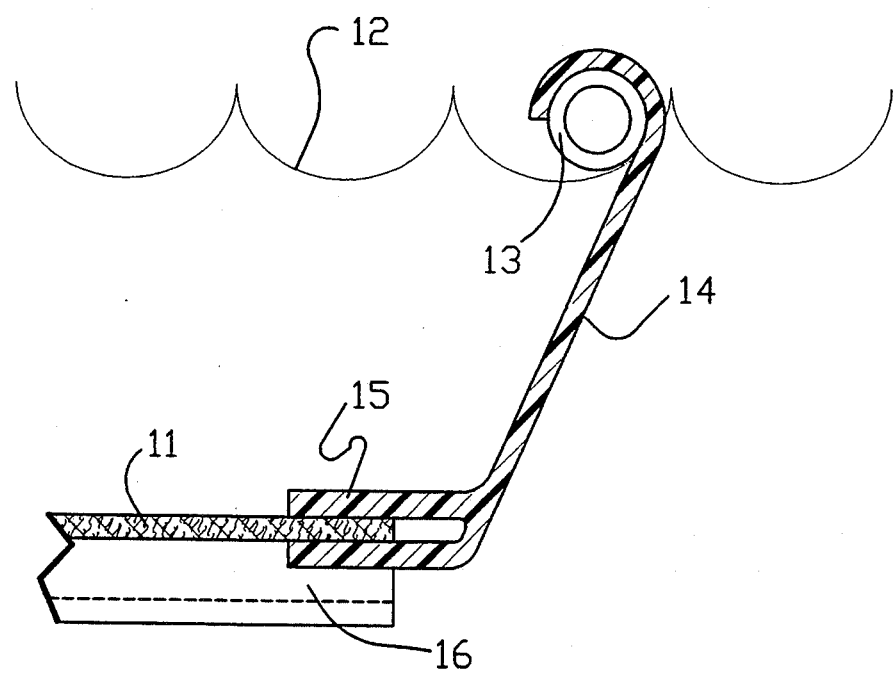
FIG. 5 is a sectional view on line 5—5 of FIG. 4.

FIG. 5 shows more detail of the engagement with the ends of sheet 11 by clip 15 of plastic hook member 14 and the engagement of such hook member 14 with the floatable tubes 13. In both instances, the engagement is springy in nature, being strong enough to permit lifting and moving units 10 in one piece and yet capable of separation upon the application of moderate force thereto.

Figure 6:
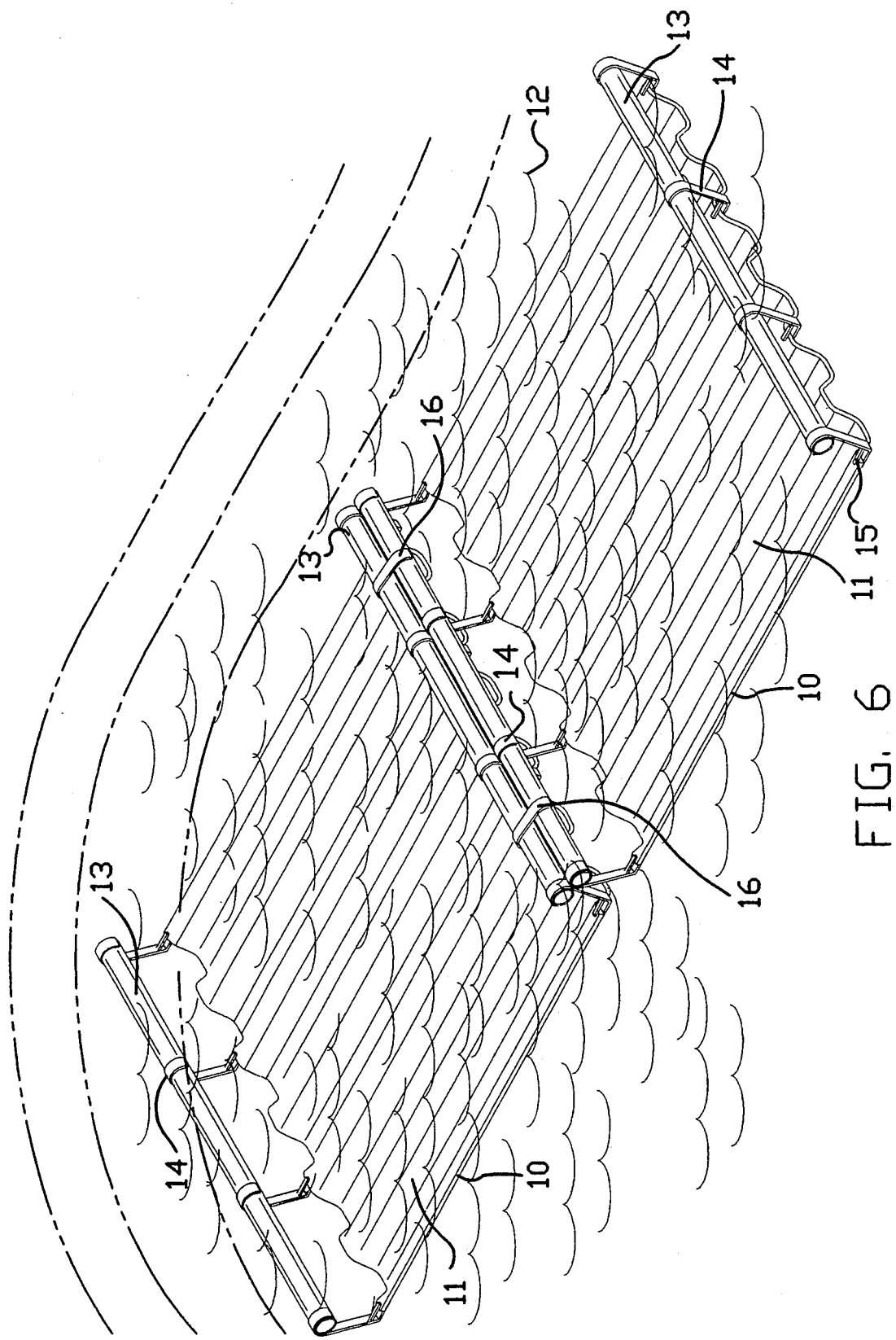
FIG. 6 is a top perspective view of several units of the present invention connected together.
Figure 7:
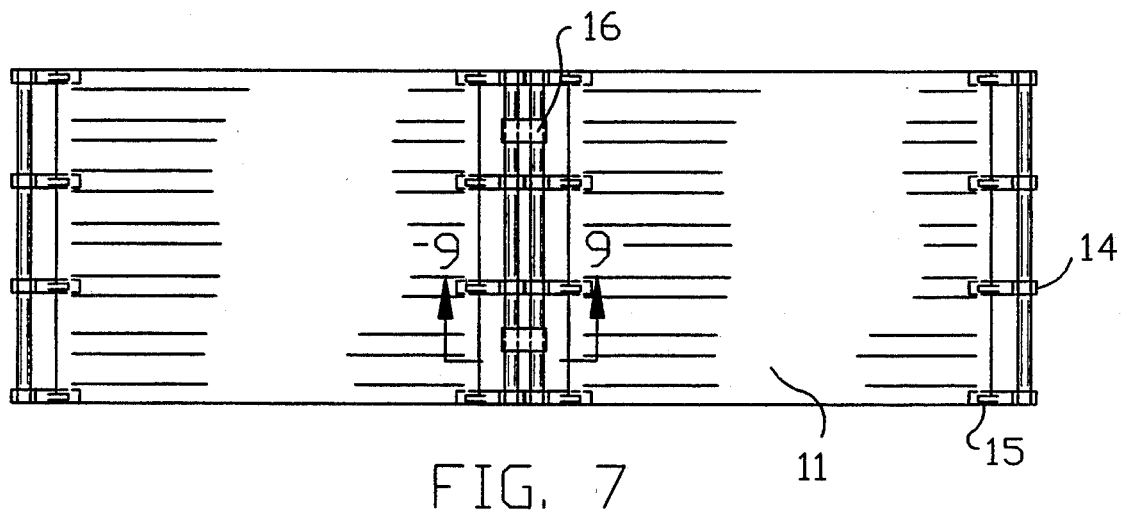
FIG. 7 is a top plan view of the units of FIG. 6.
Figure 8:
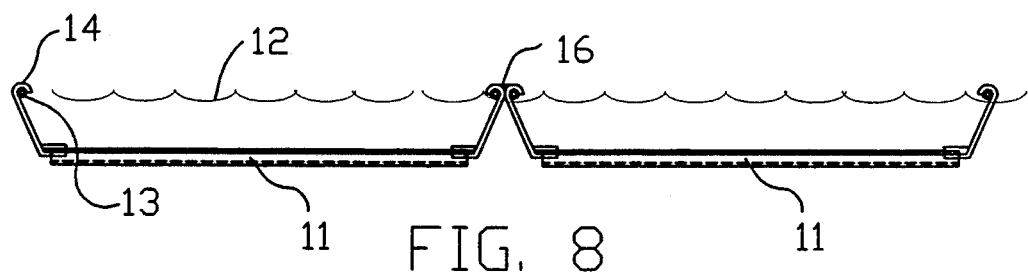
FIG. 8 is an end view of the units of FIG. 6.
Figure 9:
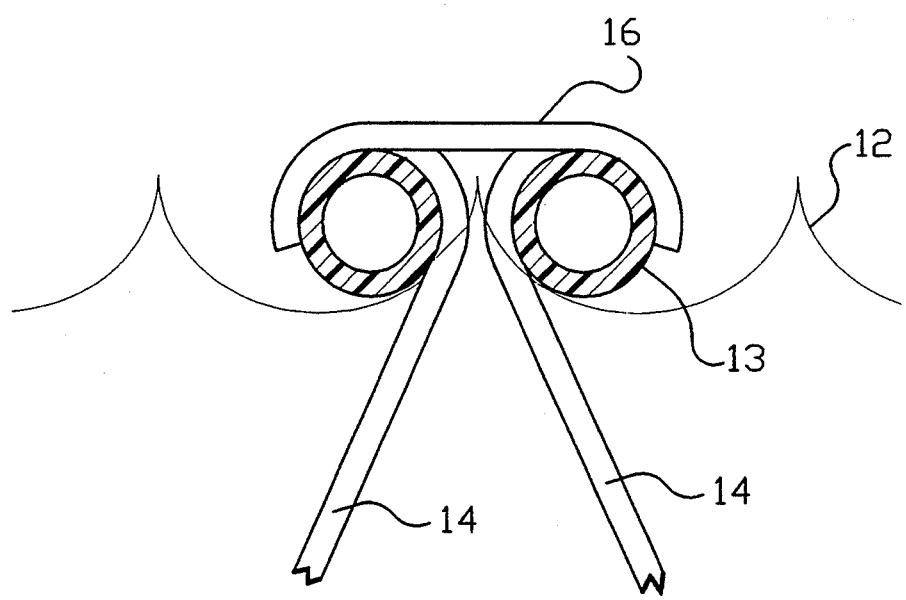
FIG. 9 is a sectional view on line 9—9 of FIG. 7.

Units 10 of the present invention are intentionally made small, i.e. about one square meter, both for flexibility in adapting to various size pool surfaces and for ease of removal and storage when not in use. FIG. 6 illustrates the coupling of two units 10 and obviously the number of units may be increased as desired. As shown in this figure, and those of FIGS. 7, 8 and 9, simple U-shaped clips 16 are snapped into place over the floatable tubes 13 of the units 10, lying in parallel on the surface of water 12. Such clips 16 are most clearly shown in FIG. 9. Like the engagement of plastic member 14 with floatable tube 13, clip 16 is springily engaged with tubes 13 and is easily removable therefrom.

In the interests of clarity, corrugations 16 have not been shaded to show the black finish of the upper surface thereof in the drawings. However, as aforesaid, the normal upper surface of sheet 11 has a matte black color while the underside of such sheet is white. To retain heat in the pool at night, the sheet 11 is unclipped from tubes 13 and inverted to put the white surface uppermost minimizing heat loss to the atmosphere. Preferably the units 10 are used in multiples to cover essentially the entire pool surface. Since the units 10 are all of the same size and configuration, a number of such units can be placed in superposed fashion for storage outside of the pool when not in use. With their relatively small size such storage is easily accomplished in most pool settings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved solar pool heater comprises: a flexible corrugated plastic sheet having a black upper surface and a white lower surface; a pair of floatable tubular plastic floats disposed on opposite parallel edges of said sheet; a plurality of rigid hook members releasably suspended from said plastic floats; clips on the lower ends of said hook members releasably engaging and supporting said plastic sheet below the surface of water on which said plastic floats are to be supported.

2. A solar heater as in claim 1 wherein multiple sets of floatable tubes and supported corrugated plastic sheets are releasably connected together in parallel.

* * * * *